(12) United States Patent
Spencer

(10) Patent No.: US 7,478,260 B2
(45) Date of Patent: Jan. 13, 2009

(54) SYSTEM AND METHOD FOR SETTING A CLOCK RATE IN A MEMORY CARD

(75) Inventor: Andrew Spencer, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 816 days.

(21) Appl. No.: 10/689,244

(22) Filed: Oct. 20, 2003

(65) Prior Publication Data

US 2005/0086553 A1 Apr. 21, 2005

(51) Int. Cl.
*G06F 1/04* (2006.01)

(52) U.S. Cl. .................. 713/600; 713/320; 713/322

(58) Field of Classification Search .......... 713/500, 713/600, 320; 365/52
See application file for complete search history.

(56) References Cited

U.S. PATENT DOCUMENTS

| | | | | |
|---|---|---|---|---|
| 4,288,860 A | * | 9/1981 | Trost ........................ | 711/167 |
| 4,888,773 A | * | 12/1989 | Arlington et al. ........... | 714/764 |
| 5,778,218 A | * | 7/1998 | Gulick ....................... | 713/503 |
| 5,799,069 A | | 8/1998 | Weston et al. | |
| 5,958,027 A | * | 9/1999 | Gulick ....................... | 710/300 |
| 6,157,646 A | * | 12/2000 | Nichols ..................... | 370/395.62 |
| 6,275,896 B1 | * | 8/2001 | Kojima ...................... | 711/112 |
| 6,279,058 B1 | * | 8/2001 | Gulick ....................... | 710/58 |
| 6,347,380 B1 | | 2/2002 | Chang et al. | |
| 6,407,940 B1 | * | 6/2002 | Aizawa ....................... | 365/52 |
| 6,456,702 B2 | * | 9/2002 | Nishihara .................. | 379/93.05 |
| 6,529,548 B1 | * | 3/2003 | Aoki et al. ................. | 375/224 |
| 6,647,502 B1 | * | 11/2003 | Ohmori ..................... | 713/322 |
| 6,721,328 B1 | * | 4/2004 | Nichols et al. ............ | 370/395.62 |
| 6,741,570 B1 | * | 5/2004 | Kojima ...................... | 370/253 |
| 6,807,235 B2 | * | 10/2004 | Yano et al. .................. | 375/259 |
| 6,965,737 B1 | * | 11/2005 | Somashekhar ............. | 398/54 |
| 6,990,598 B2 | * | 1/2006 | Sherburne, Jr. ........... | 713/600 |
| 6,990,599 B2 | * | 1/2006 | Takamiya et al. .......... | 713/600 |
| 7,197,250 B2 | * | 3/2007 | Somashekhar ............. | 398/175 |
| 2003/0107779 A1 | * | 6/2003 | Chen et al. ................. | 358/486 |

FOREIGN PATENT DOCUMENTS

JP 07-170503 * 7/1995

* cited by examiner

*Primary Examiner*—Chun Cao

(57) ABSTRACT

A memory card that includes a buffer configured to receive transactions, a storage media, and a control circuit coupled to the buffer and the storage media is provided. The control circuit is configured to cause a clock signal to be provided to the buffer and the storage media at a clock rate that varies in dependence on a detected rate of the transactions received by the buffer.

32 Claims, 3 Drawing Sheets

SYSTEM AND METHOD FOR SETTING A CLOCK RATE IN A MEMORY CARD

THE FIELD OF THE INVENTION

The present invention generally relates to memory cards, and more particularly to a system and method for setting a clock rate of a memory card.

BACKGROUND OF THE INVENTION

Many electronic devices such as digital cameras, personal and laptop computer systems, personal digital assistants (PDA), televisions, and audio and/or video media players are configured to store information to and retrieve information from memory cards that are detachable from the devices. These memory cards offer users the ability to store and transfer information between various devices by storing information from one device onto a memory card and transferring the information from the memory card to another device. For example, a user may take pictures using a digital camera that stores the pictures on a memory card. The user may then couple the memory card to a computer system to transfer the pictures from the memory card to the computer system.

Memory cards, like all electronic devices, consume electrical power in operation. The amount of power consumed by a memory card may vary with an internal clock rate of the memory card. In other words, faster clock rates may generally cause more power to be consumed by the memory card than slower clock rates. Although faster clock rates may enhance the performance of the memory card by allowing it to transfer information to and from the host device at a faster rate, the host device may not need such enhanced performance at various times. At these times, relatively slower performance produced as a result of a relatively slower clock rate may be sufficient to meet the needs of the host device.

In addition, different types of host devices may place different performance requirements on a memory card. For example, one type of device that uses a particular memory card may require higher performance from the memory card than another type of device that uses the memory card.

SUMMARY OF THE INVENTION

The present disclosure provides a memory card that includes a buffer configured to receive transactions, a storage media, and a control circuit coupled to the buffer and the storage media. The control circuit is configured to cause a clock signal to be provided to the buffer and the storage media at a clock rate that varies in dependence on a detected rate of the transactions received by the buffer.

DETAILED DESCRIPTION

Figure 1:
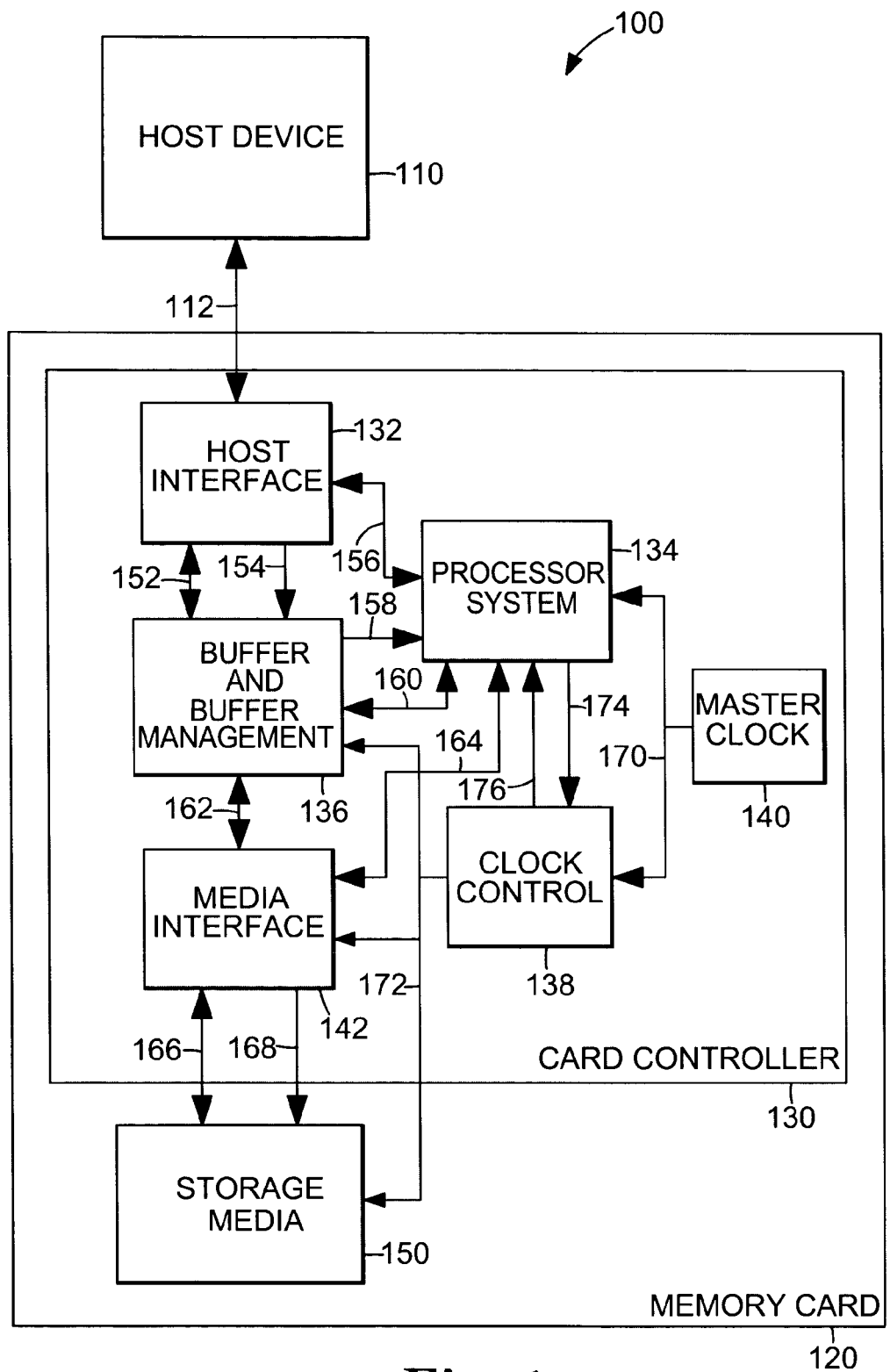
FIG. 1 is block diagram illustrating an embodiment of a system for setting a clock rate of a memory card.

Embodiments of the invention are better understood with reference to the following drawings. The elements of the drawings are not necessarily to scale relative to each other. Like reference numerals designate corresponding similar parts.

FIG. 1 is a block diagram illustrating an embodiment of a system 100 for setting a clock rate of a memory card 120 that is coupled to a host device 110, e.g., a digital camera, a personal or laptop computer system, a personal digital assistant (PDA), a television, or an audio and/or video media player such as an MP3 player. The clock rate of memory card 120 may be set to a rate that corresponds with a rate of transactions between memory card 120 and host device 110 as described in additional detail herein below.

Memory card 120 may be any type of memory card such as a CompactFlash™ memory card, a MultiMediaCard™ memory card, a Secure Digital memory card, or a Memory Stick™ memory card. Memory card 120 may be detached or removed from host device 110 and used with other host devices.

As shown, memory card 120 includes a card controller 130 and storage media 150. Card controller 130 includes a host interface 132, a processor system 134, a buffer and buffer management circuit 136, a clock control circuit 138, a master clock 140, and a media interface 142. Storage media 150 includes at least one storage medium configured to store information and may include any type or combination of non-volatile electrical, magnetic, or optical storage media such as flash memory, magnetic RAM (MRAM), atomic resolution storage (ARS), or magnetic or optical disks. The components within card controller 130 may each include hardware, software, or a combination of hardware and software.

In operation, host device 110 provides transactions such as read and write transactions, data associated with the transactions, commands, a host clock signal, and other information to memory card 120 using a bus 112. The transactions, data, commands, host clock signal, and other information are received using host interface 132. The transactions and data associated with the transactions are stored into the buffer in the buffer and buffer management circuit 136 using data lines 152 and host clock line 154. Processor system 134 provides control signals to and receives information from host interface 132 using host interface lines 156. Processor system 134 also provides control signals to and receives information from the buffer using buffer control lines 160. Buffer and buffer management circuit 136 provides buffer empty/buffer full signals to processor system 134 using one or more lines 158. In response to control signals from processor system 134, buffer and buffer management circuit 136 provides transactions and data to media interface 142 using data lines 162. Media interface 142 provides the data and media control signals to storage media 150 using data lines 166 and control lines 168, respectively. Processor system 134 provides control signals to and receives information from media interface 142 using media interface control lines 164.

In response to a write transaction from host device 110, host interface 132 stores the write transaction and the data to be stored in the buffer in buffer and buffer management circuit 136. In response to signals from processor system 134, the buffer management circuit provides the write transaction and the data from the buffer to media interface 142. Media interface 142 causes the data to be stored in storage media 150.

In response to a read transaction from host device 110, host interface 132 stores the read transaction in the buffer in buffer and buffer management circuit 136. In response to signals from processor system 134, the buffer management circuit provides the read transaction from the buffer to media interface 142. Media interface 142 causes data to be read from storage media 150 and stored in the buffer. The buffer management circuit and/or processor system 134 cause the data to be transferred from the buffer to host device 110 using host interface 132.

Master clock 140 generates a master clock signal, CLMM, at a master clock rate and provides the master clock signal CLMM to processor system 134 and clock control circuit 138. Processor system 134 provides control signals to clock control circuit 138 using a media clock control line 174. Clock control circuit 138 provides a media clock signal, CLKm, at a media clock rate to buffer and buffer management circuit 136, media interface 142, and storage media 150 using lines 172. Clock control circuit 138 also provides a processor clock signal to processor system 134 using a line 176. As described in detail below, processor system 134 may cause the media clock rate and/or the processor clock rate to be set at the same rate or a different rate as the master clock rate.

In operation, memory card 120 consumes an amount of power that may vary directly with the media clock rate of media clock signal CLKm. In other words, memory card 120 may consume more power in response to the media clock rate being set to a relatively high or fast rate and less power in response to the media clock rate being set to a relatively low or slower rate. It may be generally desirable to minimize the amount of power consumed by memory card 120.

The functions of memory card 120 include storing data received from host device 110 and providing data to host device 110 in response to a request from host device 110. The rate at which host device 110 may call upon memory card 120 to perform these functions may vary over time. In addition, memory card 120 may be configured to operate with different types of host devices 110. Host device 110 may be a digital camera, a personal or laptop computer system, a personal digital assistant (PDA), a television, or an audio and/or video media player such as an MP3 player, for example. The rates at which different types of host devices 110 may call upon memory card 120 to perform these functions may vary. For example, a digital camera may interact with memory card 120 at different rates than an MP3 player.

Accordingly, as described in additional detail below, memory card 120 is configured to determine a rate of transactions to and/or from host device 110 and to set the media clock rate of the media clock signal CLKm in response to the rate of transactions in order to minimize the amount of power consumed by memory card 120 while ensuring that memory card 120 performs at a rate suitable for a particular host device 110.

Figure 2:
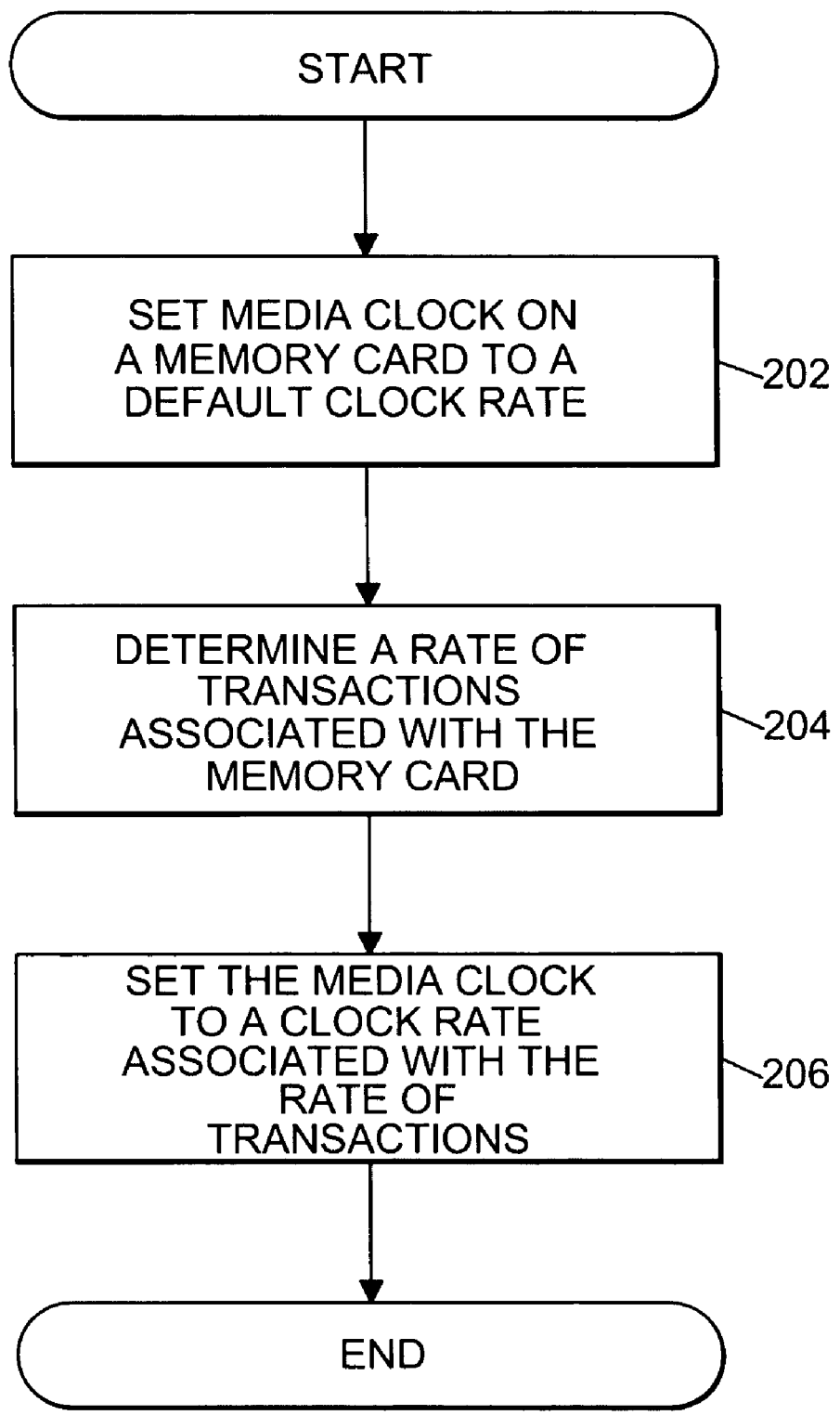
FIG. 2 is a flow chart illustrating an embodiment of a method for setting a clock rate of a memory card.

The operation of memory card 120 will now be described with reference to FIGS. 1 and 2. As shown in FIG. 2, the media clock signal CLKm on memory card 120 is set to a default clock rate by clock control circuit 138 as indicated in a block 202. The default clock rate may be a rate programmed by the manufacturer of the card and may be set in response to memory card 120 being powered up or reset. Alternatively, the default rate may be the rate at which memory card 120 was previously operating, i.e. prior to memory card 120 being powered down or reset.

A rate of transactions associated with memory card 120 is determined as indicated in a block 204. The rate of transactions includes a number of transactions received by memory card 120 from host device 110 over a time period. The transactions may include read transactions configured to cause information to be read from storage media 150 and provided to host device 110 and/or write transactions configured to cause information to be received from host device 110 and written to storage media 150.

In the embodiment of FIG. 1, processor system 134 determines the rate of transactions by detecting a number of transactions received by buffer and buffer management 136 over one or more time periods. Processor system 134 may perform this function in various ways. For example, processor system 134 may determine the rate of transactions by monitoring how quickly the buffer in buffer and buffer management 136 fills and empties. To do so, processor system 134 monitors the number of times that it receives a buffer full signal and/or buffer empty signal from buffer and buffer management 136 over one or more time periods. Buffer and buffer management 136 generates the buffer full signal to indicate that the buffer is full and generates the buffer empty signal to indicate that the buffer is empty.

In addition, processor system 134 may determine the rate of transactions by comparing how full or empty the buffer in buffer and buffer management 136 is relative to one or more threshold values. If, for example, during a write transaction, the buffer is fuller than a high threshold, such as more than 80% full, then data is being input to the buffer faster than it is being written to storage media 150 and processor system 134 causes the clock rate of the media clock to increase. Similarly, if the buffer is less full than a low threshold, such as less than 20% full, during a write transaction, then data is being input to the buffer slower than it is being written to storage media 150 and processor system 134 causes the clock rate of the media clock to decrease. During a read transaction, processor system 134 causes the clock rate of the media clock to increase in response to determining that the buffer is less full than a low threshold, such as less than 20% full, which indicates that data is being output from the buffer faster than it is being read from storage media 150. Similarly, processor system 134 causes the clock rate of the media clock to decrease during a read transaction in response to determining that the buffer is fuller than a high threshold, such as more than 80% full, which indicates that data is being read faster from storage media 150 than it is being transferred to host device 110.

Alternatively, processor system 134 may simply count the transactions received by memory card 120 by monitoring host interface 132, buffer and buffer management 136, and/or media interface 142 over one or more time periods to determine the rate of transactions. In each of these embodiments, the rate of transactions may be associated with the number of read transactions, the number of write transactions, or the total of the number of read transactions and the number of write transactions received by memory card 120 over one or more time periods. In other embodiments, the rate of transactions of memory card 120 may be determined in other ways.

The media clock of memory card 120 is set to a clock rate associated with the rate of transactions as indicated in a block 206. In response to determining the rate of transactions, processor system 134 provides a control signal to clock control circuit 138 using media clock control line 174 to cause clock control circuit 138 to set the clock rate of the media clock. Clock control circuit 138 receives the master clock signal from master clock 140 on lines 170 and generates the media clock signal using the master clock signal. Clock control circuit 138 may generate the media clock signal at the same clock rate as the master clock signal or at a different clock rate. Clock control circuit 138 causes the media clock to be provided to the buffer in buffer and buffer management 136, media interface 142, and storage media 150 at the set clock rate. Clock control circuit 138 may also set the processor clock rate at a rate associated with the control signal.

The clock rate may vary directly with the rate of transactions. For example, in response to the rate of transactions being relatively high, the clock rate may set to a relatively high rate. Similarly, the clock rate may be set to a relatively low rate in response to the rate of transactions being relatively low. In this way, memory card 120 may be configured to process transactions at a rate that matches approximately the rate at which the transactions are received from host device 110.

Processor system 134 may determine the clock rate to be associated with the rate of transactions in various ways. For example, processor system 134 may actively and continuously monitor the empty and/or fill rates of the buffer in buffer and buffer management 136 and incrementally increase or decrease the clock rate until the transactions are processed at a desired rate. As another example, processor system 134 may include a table that lists media clock rates for each possible range of transaction rates such that processor system 134 selects the media clock rate associated with the detected rate of transactions from the table.

In other embodiments of the method shown in FIG. 2, the method may continuously repeat the functions illustrated in blocks 204 and 206. For example, subsequent to setting the media clock rate in block 206, memory card 120 may determine another rate of transactions associated with memory card 120 as indicated in block 204 and set the media clock to a clock rate associated with this other rate of transactions as indicated in block 206. In this way, memory card 120 may dynamically monitor the rate of transactions and continuously adjust the clock rate of the media clock to ensure operation at a rate suitable for host device 110.

Figure 3:
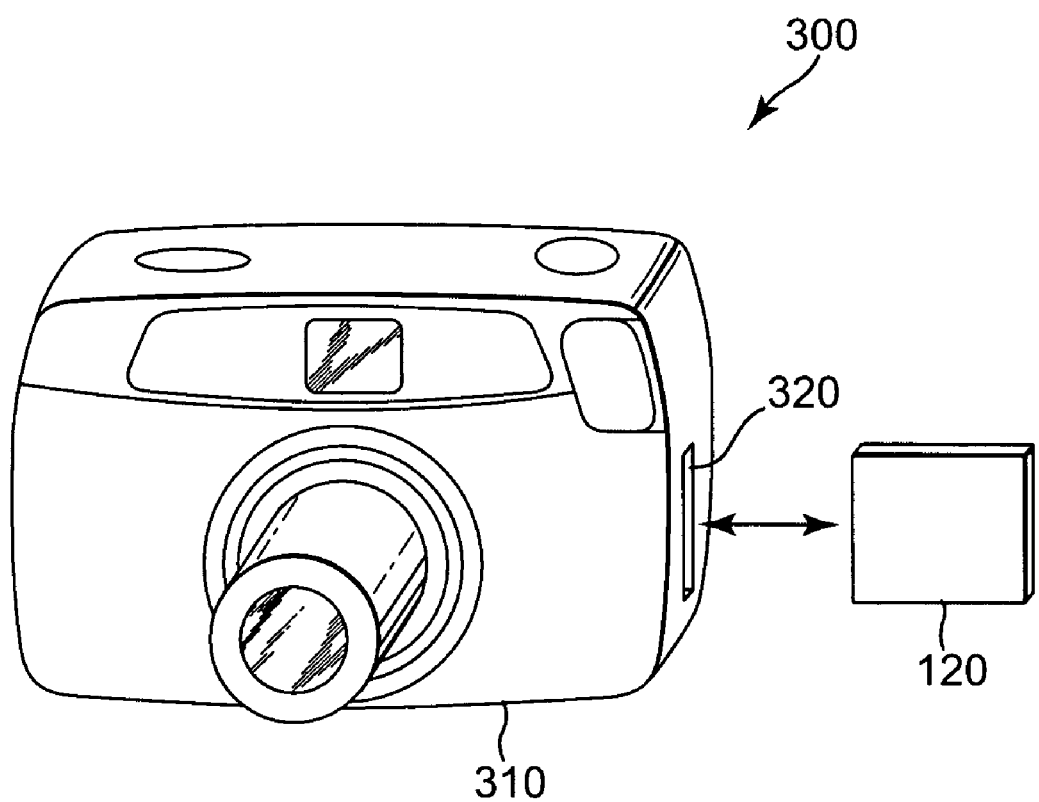
FIG. 3 is a diagram illustrating an embodiment of a system that includes a memory card configured to set a clock rate.

FIG. 3 is a diagram illustrating an embodiment of a system 300 that includes memory card 120 which configured to set a clock rate according to the rate of transactions received by memory card 120. In FIG. 3, memory card 120 is used in conjunction with a digital camera 310. Memory card 120 detachably couples to a slot 320 of digital camera 310.

Digital camera 310 illustrates one example of a host device 110 that is configured to operate with memory card 120 as described above with reference to the embodiments of FIGS. 1 and 2. In particular, digital camera 310 captures image data and stores the image data onto memory card 120. In addition, digital camera 310 retrieves image data from memory card 120 and displays the image data to a user.

To capture and store image data, digital camera 310 captures an image using an image sensor (not shown). Digital camera 310 causes image data associated with the image to be provided memory card 120 using one or more write transactions. Referring back to FIG. 1, memory card 120 receives the write transaction(s) using host interface 132 and causes the image data to be stored in the buffer in buffer and buffer management circuit 136. Processor system 134 causes the image data to be stored in storage media 150 in response to the write transaction(s) using media interface 142.

To retrieve and display an image, digital camera 310 provides one or more read transactions to memory card 120 to cause image data associated with the image to be read. Host interface 132 receives the read transaction(s) and stores the read transaction(s) in the buffer. Processor system 134 causes the image data to be read from the storage media 150 and stored in the buffer in response to the read transaction(s) using media interface 142. The buffer management circuit and/or processor system 134 cause the image data to be transferred from the buffer to digital camera 310 using host interface 132. Digital camera 310 displays the image in response to receiving the image data.

In operation with digital camera 310, memory card 120 adjusts the media clock rate of the media clock signal CLKm in the manner described above with reference to FIGS. 1 and 2.

What is claimed is:

1. A memory card comprising:
   a buffer configured to receive transactions;
   a storage media;
   a control circuit coupled to the buffer and the storage media; and
   a processor system coupled to the control circuit;
   a buffer management circuit coupled to the processor system and configured to provide at least one signal to the processor system that indicates when the buffer is full and when the buffer is empty;
   wherein the processor system is configured to detect a rate of transactions received by the buffer by determining a number of times that the buffer is full and empty from the at least one signal over a time period, and wherein the control circuit is configured to cause a first clock signal to be provided to the buffer and the storage media at a first clock rate that varies in dependence on the detected rate of the transactions.

2. The memory card of claim 1 wherein the processor system is configured to cause the control circuit to set the first clock signal to the first clock rate associated with the rate of transactions received by the buffer.

3. The memory card of claim 2 further comprising:
   a master clock configured to provide a second clock signal at a second clock rate to the processor system and the control circuit;
   wherein the control circuit is configured to generate the first clock signal using the second clock signal.

4. The memory card of claim 3 wherein the first clock rate differs from the second clock rate.

5. The memory card of claim 1 further comprising:
   a first interface coupled to the buffer and configured to receive the transactions from a host device and provide the transactions to the buffer; and
   a second interface coupled to the buffer and the storage media.

6. The memory card of claim 1 wherein the transactions include read transactions configured to cause information to be read from the storage media.

7. The memory card of claim 1 wherein the transactions include write transactions configured to cause information to be written to the storage media.

8. The memory card of claim 1 wherein the transactions include read transactions configured to cause information to be read from the storage media and write transactions configured to cause information to be written to the storage media.

9. A system comprising:
   a host device; and
   a memory card configured to couple to the host device;
   wherein the memory card includes a storage media and a buffer configured to receive transactions, wherein the memory card is configured to detect a rate of transactions received by the memory card from the host device by determining a number of times that the buffer is full and empty during a time period, and wherein the memory card is configured to provide a first clock signal to the storage media at a first clock rate that varies in dependence on the rate of transactions received by the memory card from the host device during the time period.

10. The system of claim 9 wherein the memory card includes a processor system and a control circuit coupled to the processor system, wherein the processor system is configured to detect the rate of transactions received by the memory card from the host device during the time period, and wherein the processor system is configured to cause the control circuit to set the rate of the first clock signal in response to the detected rate of transactions.

11. The system of claim 10 wherein the memory card includes a buffer management circuit, wherein the buffer management circuit is configured to provide at least one signal to the processor system that indicates when the buffer is full and when the buffer is empty, and wherein the processor system is configured to detect the rate of transactions received by the memory card during the time period using the signal.

12. The system of claim 10 wherein the memory card includes a clock configured to provide a second clock signal to the processor system and the control circuit at a second clock rate, and wherein the control circuit is configured to generate the first clock signal using the second clock signal.

13. The system of claim 9 wherein host device comprises a digital camera.

14. The system of claim 9 wherein the memory card includes an interface coupled to the buffer, and wherein the interface is coupled to receive the transactions from the host device and provide the transactions to the buffer.

15. The system of claim 9 wherein the transactions include read transactions configured to cause information to be read from the memory card and provided to the host device.

16. The system of claim 9 wherein the transactions include write transactions configured to cause information to be written from the host device to the memory card.

17. The system of claim 9 wherein the transactions include read transactions configured to cause first information to be read from the storage media and provided to the host device and write transactions configured to cause second information to be written from the host device to the memory card.

18. A method comprising:
 determining a first rate of transactions received by a buffer in a memory card by determining a first number of times that the buffer is full and empty over a first time period;
 selling a first clock signal of the memory card to a first clock rate that varies in dependence on the first rate of transactions; and
 providing the first clock signal to the buffer and a storage media in the memory card.

19. The method of claim 18 further comprising:
 determining the first rate of transactions using at least one signal that indicates when the buffer is full and when the buffer is empty.

20. The method of claim 18 further comprising:
 subsequent to determining the first rate, determining a second rate of transactions received by the memory card by determining a second number of times that the buffer is full and empty over a second time period; and
 selling the first clock signal to a second clock rate associated with the second rate of transactions.

21. The method of claim 18 wherein the transactions include read transactions configured to cause information to be read from the memory card.

22. The method of claim 18 wherein the transactions include write transactions configured to cause information to be written to the memory card.

23. The method of claim 18 wherein the transactions include read transactions configured to cause first information to be read from the memory card and write transactions configured to cause second information to be written to the memory card.

24. A memory card comprising:
 a buffer configured to receive transactions;
 a storage media;
 a clock configured to generate a clock signal and provide the clock signal to the buffer and the storage media;
 means for detecting a rate of the transactions received by the buffer by determining a number of times that the buffer is full and empty over a time period; and
 means for causing the clock signal to be set at a rate associated with the rate of transactions.

25. The memory card of claim 24 further comprising:
 an interface coupled to the buffer;
 wherein the interface is configured to receive the transactions from a host device and provide the transactions to the buffer.

26. The memory card of claim 24 wherein the transactions include read transactions configured to cause information to be read from the storage media.

27. The memory card of claim 24 wherein the transactions include write transactions configured to cause information to be written to the storage media.

28. The memory card of claim 24 wherein the transactions include read configured to cause information to be read from the storage media and write transactions configured to cause information to be written to the storage media.

29. A memory card comprising:
 a buffer;
 an interface configured to receive transactions from a host device and provide the transactions to the buffer;
 a storage media;
 a control circuit coupled to the buffer and the storage media; and
 a processor system coupled to the control circuit;
 wherein the processor system is configured to detect a rate of transactions received by the buffer by determining a number of times that the buffer is full and empty over a time period, wherein the processor system is configured to cause the control circuit to set a first clock signal to a first clock rate that varies in dependence on the rate of transactions received by the buffer, and wherein the control circuit is configured to cause the first clock signal to be provided to the buffer and the storage media.

30. The memory card of claim 29 further comprising:
 a master clock configured to provide a second clock signal at a second clock rate to the processor system and the control circuit;
 wherein the control circuit is configured to generate the first clock signal using the second clock signal.

31. The memory card of claim 29 wherein the transactions include read transactions configured to cause information to be read from the storage media.

32. The memory card of claim 29 wherein the transactions include write transactions configured to cause information to be written to the storage media.

* * * * *

UNITED STATES PATENT AND TRADEMARK OFFICE
CERTIFICATE OF CORRECTION

PATENT NO. : 7,478,260 B2  Page 1 of 1
APPLICATION NO. : 10/689244
DATED : January 13, 2009
INVENTOR(S) : Andrew Spencer It is certified that error appears in the above-identified patent and that said Letters Patent is hereby corrected as shown below:

In column 7, line 44, in Claim 18, delete "selling" and insert -- setting --, therefor.

In column 7, line 59, in Claim 20, delete "selling" and insert -- setting --, therefor.

Signed and Sealed this

Twenty-fifth Day of August, 2009

David J. Kappos
*Director of the United States Patent and Trademark Office*